No. 662,331. Patented Nov. 20, 1900.
C. E. WILLIS.
DEVICE FOR CONTROLLING HORSES.
(Application filed Feb. 12, 1900.)
(No Model.)
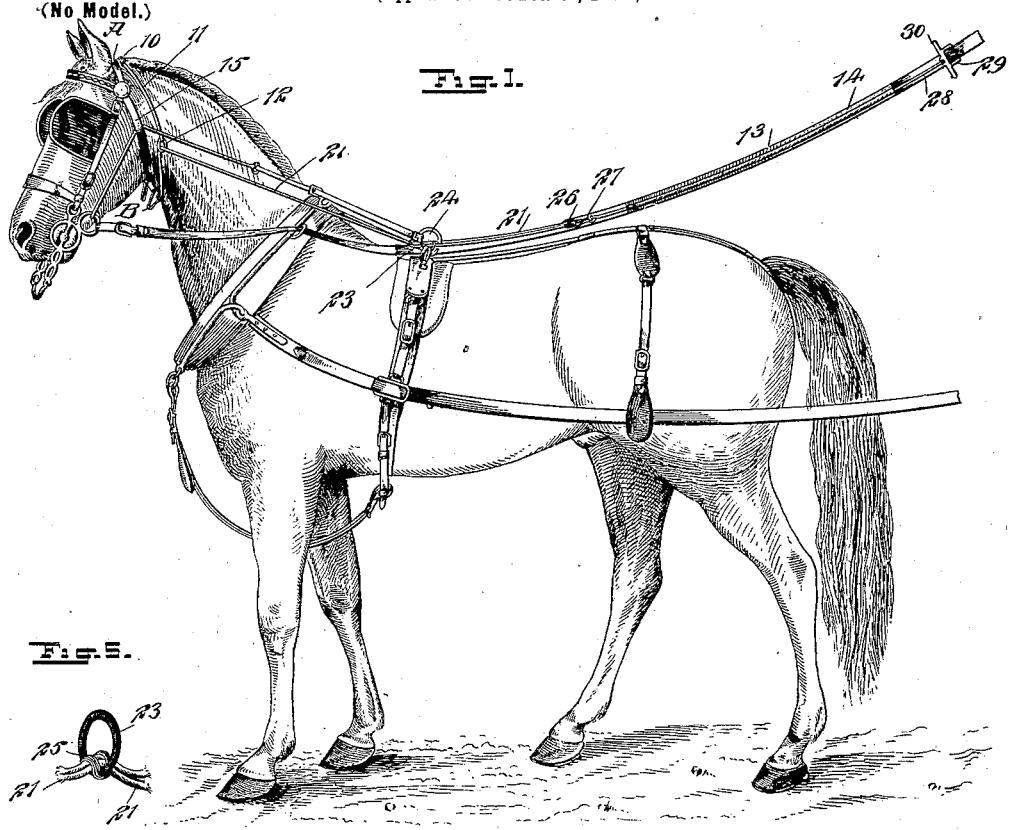
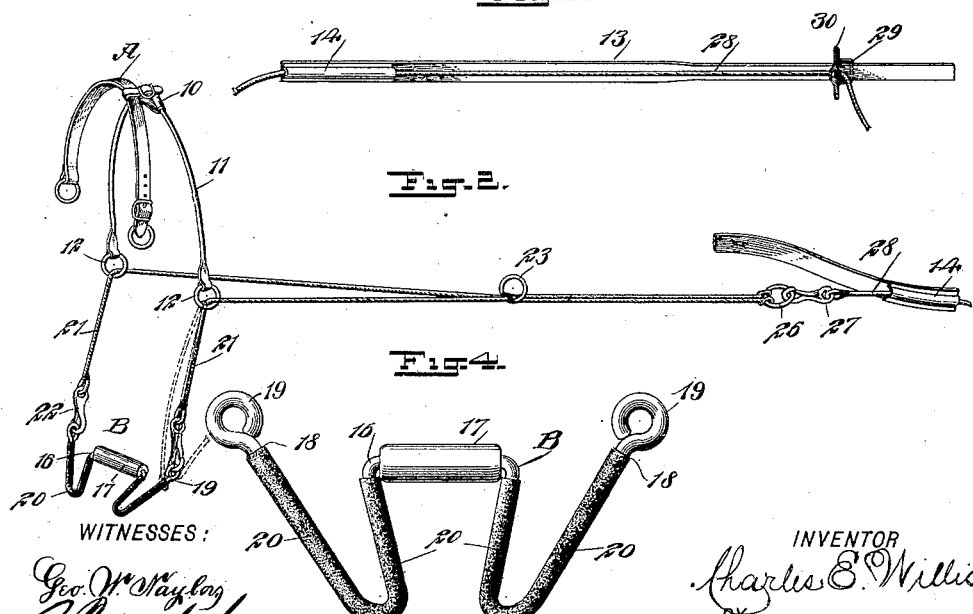
WITNESSES:
INVENTOR
Charles E. Willis
BY
ATTORNEYS

UNITED STATES PATENT OFFICE.

CHARLES E. WILLIS, OF NEW YORK, N. Y.

DEVICE FOR CONTROLLING HORSES.

SPECIFICATION forming part of Letters Patent No. 662,331, dated November 20, 1900.

Application filed February 12, 1900. Serial No. 4,938. (No model.)

*To all whom it may concern:*

Be it known that I, CHARLES E. WILLIS, a citizen of the United States, and a resident of the city of New York, borough of Manhattan, in the county and State of New York, have invented a new and Improved Harness, of which the following is a full, clear, and exact description.

One purpose of the invention is to provide an attachment for harness which will not detract from its appearance and which is especially designed for controlling vicious or unruly animals while the driver is in the vehicle or the rider is in the saddle.

A further purpose of the invention is to so construct the attachment and locate it upon the harness that it will always be in position for instant use and so that the windpipe of the animal may be brought under pressure or contracted without injury to said animal, thus compelling the animal to release the bit, if held between the teeth and also compelling the animal under such and other conditions of runaway action to quickly check its speed and come to a halt.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 illustrates the application of the improved attachment to a harness and likewise the manner in which it is applied to the animal. Fig. 2 is a perspective view of the attachment and a perspective view of the head-band of the bridle to which the attachment is applied. Fig. 3 is a perspective view of a portion of a rein, illustrating the manner in which the attachment is guided along the said rein. Fig. 4 is a side elevation of the portion of the attachment designed to exert pressure on the windpipe of the animal, and Fig. 5 is a detail view of a guide for the attachment.

A loop or other form of guide 10 is located at or about the central portion of the head-band A of the bridle, and a strap 11 is passed through the loop or guide, adapted to extend down at each side of the animal's neck and having terminal rings 12. This slight addition to the bridle and an addition to one of the driving-reins 13 are the only departures from the usual construction of harness. The addition to the driving-rein, as shown in Figs. 1, 2, and 3, is in the nature of a longitudinal guide 14, intended to receive the lead-line of the device, as will be hereinafter described. This guide 14 only extends from a point near the center of the rein to a point within easy reach of the driver, and the guide usually consists of an elongated sleeve, of leather or other material, stitched or otherwise secured to one side of the rein, as illustrated.

The improvement consists, mainly, of what may be termed a "controlling" or "curbing" device B, made of metal or of other suitable material, and means for applying the same. When the animal is in harness, the controlling device is to be supported from the terminals of the strap carried by the head-band A, and the position of the curbing or controlling device is such that it may be brought to bear upon the windpipe of the animal, preferably at a point slightly below the throat-strap 15, as indicated in Fig. 1. The controlling device B may have various shapes. One which has been found effective and which is illustrated in Fig. 4 consists of a central bow-section 16, provided with a loosely-mounted roller 17 at its upper or connecting member, and oppositely-diverging limbs 18, which constitute continuations of the extremities of the side members of the bow-section. The limbs 18 terminate in eyes 19 or their equivalents, and the limbs 18 and side members of the bow-section of the controlling device, as shown, may be provided with a covering 20, of leather, felt, fabric, or other material, which covering not only serves to protect the device, but also to prevent chafing.

The upper portion of the bow-section of the device is that which is employed to exert pressure on the windpipe, and this section especially may vary in form. For example, the roller 17 may be omitted and the connecting member of the bow-section may be concaved, convexed, or more or less pointed at the center or said member may have any irregular or polygonal formation which may be found best adapted for the purpose intended.

The controlling device is held in position by cords or straps 21. These cords or straps are connected by clips 22 or otherwise with the terminal eyes 19 of the controlling device, as is particularly shown in Fig. 2. These cords or straps 21 are passed through the terminal rings 12 of the strap supported by the head-band A, as is also best shown in Fig. 2. The straps or cords 21 may be in one piece, as illustrated, or each strap or cord may be independent, in which latter event they are connected at a point preferably rearward of the saddle of the harness; but in either event the straps or cords 21 are passed through a guide-ring 23, and this guide-ring is adapted to be passed over the check-hook 24 of the harness. Where the straps or cords 21 pass through the ring 23, a guide-loop 25, which may be of an elastic material, is passed over the cords and around the bottom portion of the guide-ring 23, so that although the cords or straps 21 may be readily drawn through the ring they are prevented from moving sidewise or in a vertical direction. The guide-loop 25 serves also to maintain the controlling device in proper position by preventing the forward portion of the straps or cords 21 becoming slack. The straps or cords 21 at their ends are shown connected with a ring 26, and this ring is connected by a snap 27 or the equivalent thereof with a lead-line 28 of any desired material. This lead-line is passed through the guide-sleeve 14, heretofore referred to as attached to one of the driving-reins, as shown in Fig. 3. The rear end of the lead-line 28 is usually attached to a slide 29, loosely mounted on the rein, as shown in Fig. 3, and this slide when employed is preferably provided with side projections 30, so that ample purchase for the fingers may be obtained and the driver be enabled to quickly and forcibly apply the controlling device to the windpipe of the animal.

I desire it to be understood that instead of the cords or straps 21 being passed singly through the supporting-eyes 12, as shown in positive lines in Fig. 2, the straps may be attached directly to the limbs 18 of the controlling device at a point below the terminal eyes 19, and after the straps so attached have been passed through the supporting-rings 12 the said cords or straps may be carried downward and rearward through the terminal eyes 19 and then through the guide-ring 23 to the driving-rein, as has been specified.

I desire it to be understood that the harness to which the device is applied may or may not be provided with a checkrein and that the head-band A may be omitted and other means of support provided; also, that a tension mechanism, if desired, may be connected with the controlling device B, with a view to quickly return the said device to its normal position after said device has been applied and released.

It is intended that the pressure applied to the connecting member 16 of the central section of the controlling device shall be at right angles to the windpipe or as nearly so as possible. The spaces between the limbs 18 of the controlling device B are intended to receive the projecting muscles of the neck, and so facilitate the action of the central section of the controlling device.

Having thus described my invention, I claim as new and desire to secure by Letters Patent—

1. In a harness, a strap secured to the head-band of a bridle to extend down at each side of the animal's neck and provided with rings at its ends, a curbing device having a central bow portion and diverging limbs provided with eyes at their ends, cords or straps secured to the eyes of the curbing device and passed through the rings of the said strap, a guide-ring secured to the cords or straps and adapted to engage the check-hook of the harness, and a lead-line connected with the said cords or straps and extending within reach of the driver, substantially as described.

2. In a harness, a strap secured to the head-band of a bridle to extend down at each side of the animal's neck and provided with rings at its ends, a curbing device having a central bow-section and end limbs, each provided with an eye at its end, cords or straps secured to the eyes of the curbing device and passed through the rings of the said strap, a guide-ring secured to the cords or straps and adapted to engage the check-hook of the harness, a driving-rein provided with a guide-sleeve, and a lead-line connected with the cords or straps, passed through the sleeve of the rein and secured to the rein in reach of the driver, substantially as described.

3. In a harness, a strap secured to the head-band of a bridle to extend down at each side of the animal's neck and provided with rings at its ends, a curbing device for exerting pressure upon the windpipe of an animal, cords or straps secured to the curbing device and passed through the rings of the said strap, a driving-rein having a guide-sleeve, a lead-line connected with the cords or straps and passed through the guide-sleeve of the rein, and a slide on the rein and to which the lead-line is secured, substantially as described.

4. In a harness, a strap secured to the head-band of the bridle and extending down on each side of the animal's neck, each end of the strap being provided with a ring, a curbing device for exerting pressure upon the windpipe of an animal, cords or straps secured to the curbing device and passed through the rings of the said strap, a guide-ring secured to the cords or straps and adapted to engage the check-hook of the harness, a driving-rein provided with a guide-sleeve, a lead-line secured to the said cords or straps and passed through the sleeve of the rein, and a slide on the rein and to which the lead-line is secured, substantially as described.

In testimony whereof I have signed my name to this specification in the presence of two subscribing witnesses.

CHARLES E. WILLIS.

Witnesses:
J. FRED. ACKER,
EVERARD BOLTON MARSHALL.